United States Patent [19]
Scolly et al.

[11] Patent Number: 6,003,010
[45] Date of Patent: Dec. 14, 1999

[54] APPARATUS AND METHOD FOR IMPROVED AIRBORNE TRANSPORTATION OF SMALL PACKAGES

[76] Inventors: Robert A. Scolly, 22 Briarwood La., Wakefield, Mass. 01880; James J. Tufts, 4 Marion St., Wollaston, Mass. 02170

[21] Appl. No.: 08/822,215

[22] Filed: Mar. 21, 1997

[51] Int. Cl.[6] ...................................................... B61K 1/02
[52] U.S. Cl. .............................. 705/8; 705/407; 705/408; 177/25.15; 232/27
[58] Field of Search ................................ 705/8, 407, 408, 705/406, 410; 177/25.15; 232/27

[56] References Cited

U.S. PATENT DOCUMENTS 5,233,532    8/1993    Ramsden ................................. 705/407

*Primary Examiner*—Thomas Peeso
*Attorney, Agent, or Firm*—Wolf, Greenfield & Sacks P.C.; David Wolf

[57] ABSTRACT

Packages are received from multiple sources at one central facility. The approved and verified packages are then transported to different airlines for expedited transport. The method features receiving self-reported identification and objective security information about the source and/or the package, and maintaining a database of this information. The security information is evaluated for each of the packages, and they are selectively approved based on this evaluation.

25 Claims, 4 Drawing Sheets

APPARATUS AND METHOD FOR IMPROVED AIRBORNE TRANSPORTATION OF SMALL PACKAGES

RELATED APPLICATION

This application claims the benefit of application Ser. No. 08/622,570, filed Mar. 25, 1996, which is herein incorporated by reference.

FIELD OF THE INVENTION

This application relates to the field of package dispatching and transportation, and more particularly to improvements in methods and apparatus for urgent airborne transportation of small unaccompanied packages.

BACKGROUND OF THE INVENTION

Airlines have been accepting small packages for their next available flight. They typically accept packages weighing from one ounce or so to 70 pounds from independent shippers at counters for receiving small packages, and ship them in the next regularly scheduled passenger flight. At the airport, airlines generally verify the identity of a sender, prepare an airway bill, and they may make a record of package contents as reported by the sender. The package is then usually put into a unit load device (ULD) and put on a plane. These procedures are not optimal, especially in light of today's airport security and congestion problems.

SUMMARY OF THE INVENTION

In one general aspect, the invention features receiving packages from multiple sources at one central facility. The approved and verified packages are then transported to different airlines for expedited transport. The method features receiving self-reported identification and objective security information about the source and/or the package, and maintaining a database of this information. The security information is evaluated for each of the packages, and they are selectively approved based on this evaluation. Generally, different air carriers are selected for the approved packages, and they are transported from the processing facility to the passenger air carriers. The security information for each of the packages is retained until after the selected airline has transported that package to its destination.

In preferred embodiments, receiving the security information includes photographing a person delivering each package, reproducing identification belonging to a person delivering the package, and/or obtaining scanned images of the contents of the package. The packages received at the processing facility weigh less than 70 lbs, the packages are transported rampside within two hours or even within half an hour after they are received, for substantially all of the packages received at the processing facility. Passenger air carrier scheduling information can be displayed at the facility for the different air carriers. Maintaining the database includes storing by a computer a record that associates the security information with information about the transportation of the package, and the computer can communicate with the passenger air carriers. Inbound packages and related security information can also be received from the airlines.

In another general aspect, the invention features a facility for selective transport of packages. It includes a central receiving area for receiving packages from individuals, and security apparatus near the receiving area for obtaining and recording in a database security information relating to the package and the delivery individual. Airline facilities are disposed near the receiving area, and the facility has transportation to transport the packages from the receiving area to the airline facilities.

In preferred embodiments, the receiving area and the security apparatus are located in a structure which opens into a secure periphery of an airport and there are parking spaces within 100 feet of the receiving area. The facility includes a computer system including record storage responsive to the security apparatus, which can associate security information from the security apparatus with information relating to transportation of the package. The computer can have links to the airlines and there can be a display in the receiving area. The security apparatus can include image capture apparatus to capture images of delivery personnel, of their identification, or from within the packages. The facility can also include a sorting area for separating the received packages destined for different passenger airline carriers.

In a further aspect, the invention features a memory for storing data for access by an application program being executed on a data processing system, which includes a package transportation identification field containing information identifying a sender of a package, a routing information field containing information identifying one of a plurality of passenger air carriers that is to transport the package, and a security information field containing security information about the sender of the package.

Because one aspect of the invention eliminates the need to process small packages for expedited delivery through crowded passenger airline terminal areas where parking is frequently scarce or banned altogether, the sender or receiver of a package may avoid the difficult task of reaching these areas with a delivery vehicle. As a result, commercial courier and delivery services are able to employ delivery vehicles that are operated by a single individual, as a driver is not needed to double park or drive around while a second employee brings a package to or from an airline. Thus the present invention is advantageous in that it permits urgent packages to be transported in a more efficient manner.

The invention also allows persons or companies who regularly send a large number of packages via different airlines to different destinations to deal with a single processing facility. This saves the time and expense of visiting different baggage check-in areas and maintaining accounts at several airlines—as many as 50 or more in some airports.

In addition, according to certain aspects of the invention, the task of choosing the best routing for packages is simplified. Users, each with a single package, arriving at the airport facility simply choose the preferred air transport based on expediency, cost, or other considerations at the same central location. Further, the sender of multiple packages need not develop a delivery schedule that takes into account departure times for different flights at different airlines and the variability in the hours of operation and length of lines at various baggage counters.

The invention further provides increased security for unaccompanied packages, which are more likely to be dangerous than accompanied baggage. By concentrating security issues relating to small unattended packages, such as screening, training, and supervision of employees in a single organization, use of the invention improves security airport-wide. Because the employees at a centralized facility only focus on security issues surrounding unaccompanied small packages, they are less likely to make errors than if they were also required to perform the other duties of airline check-in attendants. Furthermore, use of the invention permits managers of a central facility to more efficiently train personnel for special tasks that relate only to small packages. Overall, specialization and service may reduce confusion and result in more frequent use of the service by individuals.

The invention has the additional advantage that it allows for some improvement in security without requiring each airline to implement the daunting task of screening all unaccompanied packages. Moreover, it is easier for local, federal, and airport officials to oversee a single operation than it is for them to monitor each airline's handling of small unattended packages.

Should someone attempt to ship explosives, drugs, or large amounts of currency, a central facility may be more readily able to assist law enforcement agencies in quickly identifying and tracing the source of the shipment. Versions of the system employ security measures that may be enhanced beyond that which would be practical or economical at a passenger check-in gate, such as photographing. The comparison of photographs, or other identifying characteristics of the person presenting a package with various law enforcement files or other security databases is more readily achieved using the present invention.

A centralized processing facility may also deter illegal activities. An operator of a central facility can take steps to make procedures rigid, thorough, or otherwise intimidating to a criminal, without fear of alienating passengers. The deterrent effect can also exist in the procedures employed in processing incoming packages.

The invention permits centralized tracking so that shipping companies may be able to locate missing packages quickly. Because packages do not share processing with luggage, it is possible to make small package handling more reliable than luggage handling. This is particularly advantageous because quite often packages are more important to their owners than is luggage to a passenger.

Embodiments of the invention help eliminate airport congestion by reducing non-passenger pick-up and drop-off traffic at airline terminals, at a cost less than it would be to expand the terminals. The invention also has a positive impact on the availability of parking for passenger traffic and will reduce enforcement costs, towing, and curbside congestion at airports.

DETAILED DESCRIPTION

Figure 1:
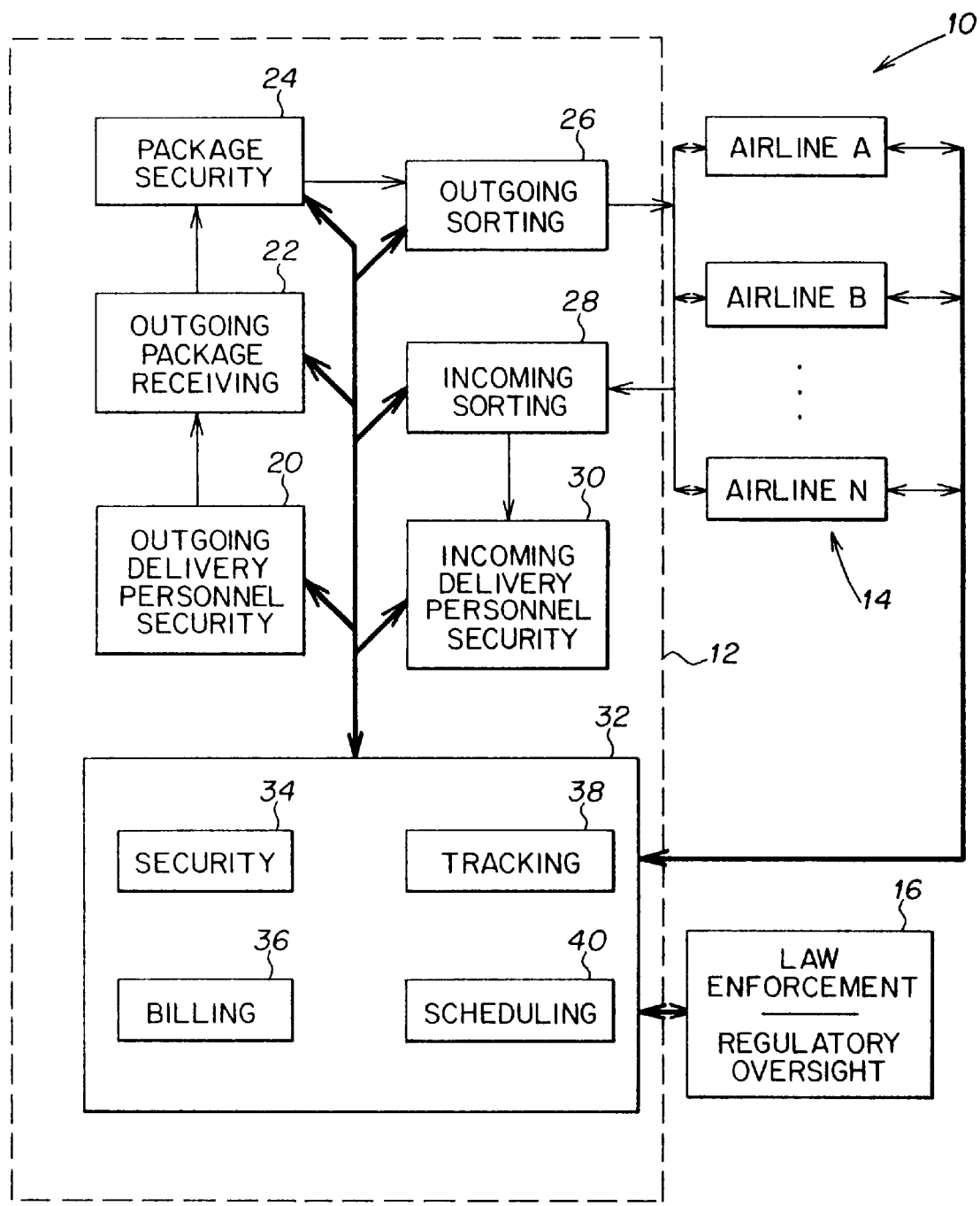
FIG. 1 is a block diagram of an illustrative embodiment of the invention.

Referring to FIG. 1, an embodiment 10 according to the invention includes a package processing facility 12 located in proximity to airline terminals 14, and may have optional dedicated links to law enforcement or regulatory agencies 16. The processing facility preferably is housed in a single building at the boundary of the secure periphery of an airport, from which vehicles can travel to and from the airline terminals. It includes areas devoted to outgoing package handling, areas devoted to incoming package handling, and a computer system 32. Outgoing package process areas include an outgoing delivery personnel security area 20, an outgoing package receiving (customer assistance) area 22, a package security processing area 24, and an outgoing sorting area 26. The incoming package processing areas include an incoming sorting area 28 and an incoming delivery personnel security area 30. Note that some of these areas can be combined or arranged in different ways. For example, incoming and outgoing delivery personnel security procedures can be performed using the same physical facility.

The computer system 32 can be linked to each of the various areas in the processing facility 12. Preferably it is also directly linked to airline computers that may or may not be located at the airline terminals 14. In addition, it is possible to link the computer system with computer systems at enforcement and/or regulatory agencies 16. The computer system can be implemented with a general purpose computer running special purpose or modified general purpose software, or it can be implemented with special purpose computing circuitry.

Figure 4:
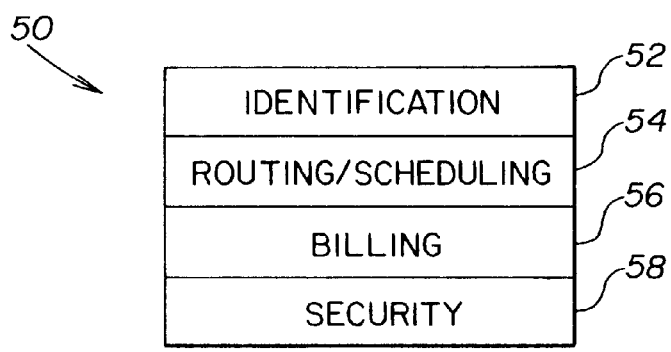
FIG. 4 is a block diagram of a computer record for use in the embodiment of FIG. 1.

The computer system 32 includes processing capabilities devoted to security 34, billing 36, package tracking 38, and scheduling 40. It maintains database records relating to transportation of packages in internal storage, such as disk storage. Referring to FIG. 4, each record 50 preferably includes a sender and receiver identification field 52, a routing and scheduling information field 54, a billing field 56, and a security field 58. This exact format is not required, however, in order to obtain benefits of certain aspects of the invention. The computer system can instead employ record formats that use the above and other fields, and subsets or variants thereof.

Figure 2:
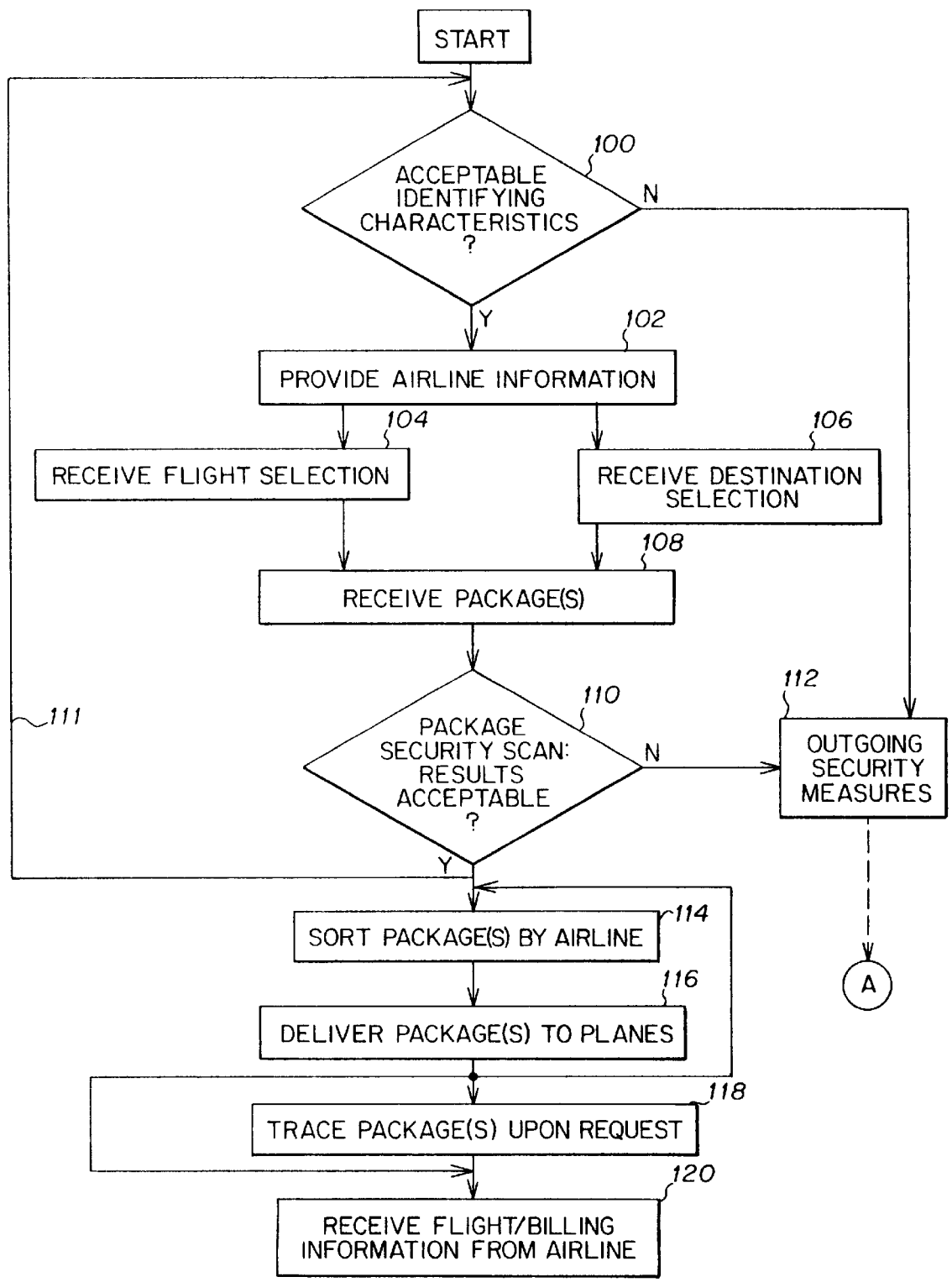
FIG. 2 is a flowchart illustrating the operation of the embodiment of FIG. 1 for outgoing packages.

In operation, referring to FIGS. 1, 2, and 4, a delivery person brings one or more packages to the outgoing delivery personnel security area 20. Ordinarily this delivery is by motor vehicle to the security area 20 located at an easily accessible location preferably on the periphery of the airport. At this area, processing facility personnel receive, evaluate, and record identifying characteristics of the delivery person (step 100). For example, processing facility personnel obtain photographs, fingerprints or voice recordings. These may be recorded with shipping information or even compared to security risk listings or law enforcement databases. In one embodiment, processing facility personnel receive the delivery person's driver's license, verify that it is in force, check that its photograph corresponds to the delivery person, and scan a copy of the license for storage with shipping information. The scanned license information may be maintained as part of the security field 58 of the record 50 for the particular shipping transaction.

If the results of the security procedures are unsatisfactory, facility personnel can initiate outgoing security measures (step 112). These may range from simply refusing to deal further with the delivery person and refraining from accepting any packages to restraining the individual and contacting law enforcement.

If the identifying characteristics of the individual delivering the package are acceptable, package processing facility personnel can then receive a flight selection (step 104) or destination selection (step 106) from the delivery person based on airline information provided to him or her (step 102) at the outgoing receiving area 22. In one embodiment, the computer system 32 displays scheduling information 40 from a variety of airlines on a monitor in the outgoing receiving area. Delivery personnel then select a desired flight based on cost, expediency, or other factors. In the alternative, the delivery person may simply provide a destination, and allow the package processing facility personnel to select an airline and a flight. Package processing facility personnel also receive the package at this time (step 108).

Once the package is in possession of the package processing facility personnel, it undergoes one or more package security procedures (step 110). These procedures may include scanning of the packages using techniques such as X-ray or thermal neutron imaging. It is also possible to detect trace amounts of vapors from the contents of the packages using trained dogs or so called "bomb sniffers." These types of systems can detect dangerous and/or illegal items such as explosives, weapons, drugs, and large quantities of currency. One provider of X-ray imaging systems tailored to this purpose is Vivid Technologies of Waltham, Mass.

If the results of the package security procedures are not satisfactory, the package processing facility personnel can undertake further outgoing security measures (step 112). These measures may include restraining the delivery person or contacting law enforcement. In the case of explosives, evacuation of the facility may also be necessary. In one embodiment, a secure vestibule with remotely actuated door locks is provided at the entrance of the package processing facility 12. If a delivery person is suspected of attempting to ship illegal or dangerous materials, he or she can be trapped in the vestibule by remotely locking its doors as he or she exits the facility.

If the package security procedures are found to be acceptable, facility personnel enter client, destination, and airline information into the computer system and issue an airway bill to the delivery person, who leaves the facility. In some embodiments, portions of the information recorded in the computer system can then be relayed by the computer system to the airlines. The package is then sent to an outgoing sorting area 26, and facility personnel begin processing the next delivery person (branch 111).

As packages are received at the outgoing sorting area 26, they can be sorted by airline (step 114). Periodically, the packages are delivered to individual planes at the different airline terminals 14 (step 116). These deliveries preferably leave the packages at a designated rampside area. The airlines then transport the packages to their destinations, which can be other package processing facilities 12.

Upon request by a delivery person or his or her employer or customer, package processing facility personnel can trace packages via the computer system 32, which is linked to computer systems belonging to the airlines (step 118). If necessary, the package processing facility personnel can even respond to a list of requests to track multiple packages from the same delivery person. The package processing facility personnel also receive flight and billing information from the airline, and may issue bills to regular customers (step 120).

Figure 3:
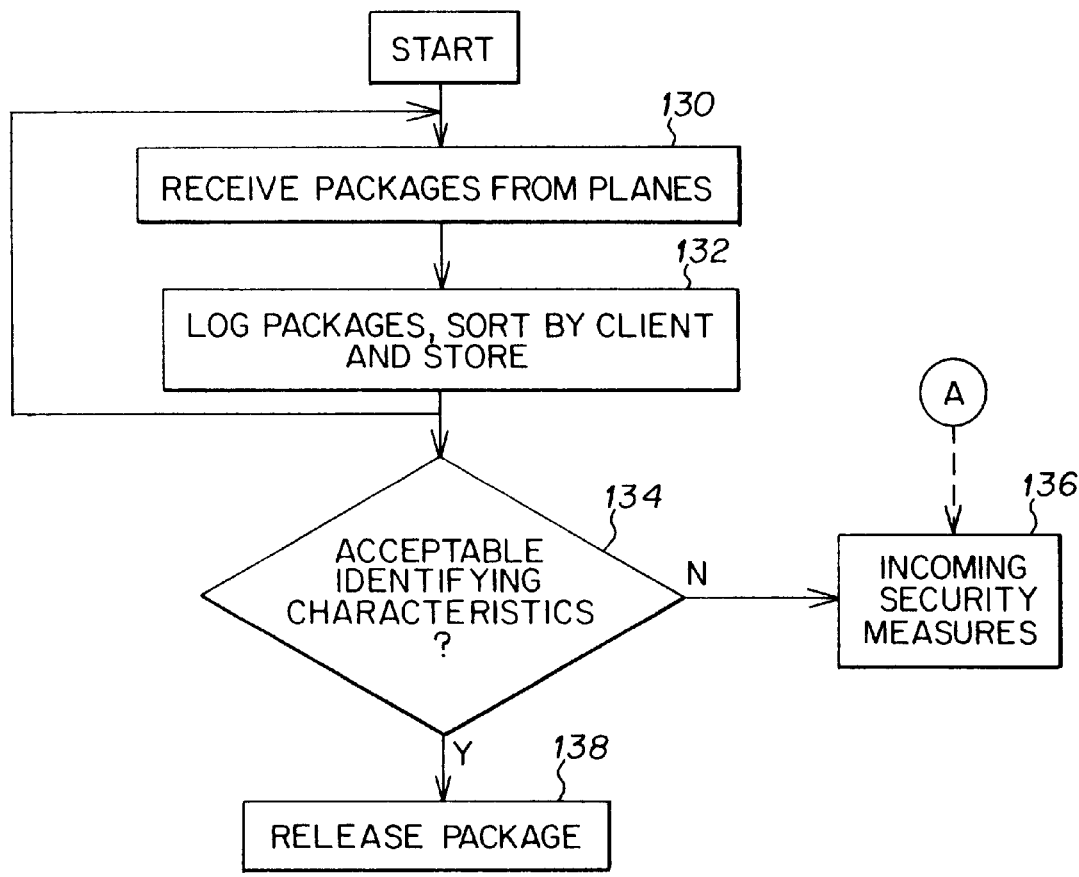
FIG. 3 is a flowchart illustrating the operation of the embodiment of FIG. 1 for incoming packages.

Referring to FIGS. 1, 3, and 4, when an airplane with a package arrives at a destination airport, the airline will unload any packages from its baggage compartment and provide them to the package processing facility (step 130). This can be done by leaving them in a pickup area, which a vehicle from the facility visits periodically. Alternatively, the airline can transport the package to the facility 12. Facility personnel then place incoming packages in an incoming sorting area 28, where they are logged, sorted by client, and stored (step 132).

When a delivery person arrives to pick up an incoming package, he or she first submits to incoming security procedures (step 134). These procedures can include one or more of the same procedures followed for outgoing packages. If the results of these procedures are unsatisfactory, package processing facility personnel can initiate incoming security measures (step 136). These can include detaining the delivery person, detaining the package, and/or contacting law enforcement. The incoming security procedures act principally as a deterrent to those wishing to ship materials illegally, although they may also provide a disincentive to those wishing to fraudulently take packages destned to others. Furthermore, it may be possible to use the records of the incoming security procedures to determine from whom to retrieve packages that have been accidentally misdelivered. The teller personnel also take a photograph of the delivery person at this time. This can be done using readily available security camera equipment, such as is available from the Filmdex Company of Centerville, Va.

The computer system 32 performs oversight and records management functions for the package processing facility 12. In particular, its security resource 34 receives and stores security information in the security field 38 of a database record 50 corresponding to an individual package transaction. The security information is distinct from self-reported identifying information, such as name, address, telephone number, and billing information. It is instead objective evidence about the package or delivery person. It can include independent confirmation of the self-reported identity of the delivery person, such as a photograph of him or her or copy of his or her identification, or it can include results of inspection of the package, such as an x-ray images of its contents.

Upon receipt of packages, package processing facility personnel provide the computer system with sender and receiver identification information, and this information is stored in the identification field 52 of the record for that transaction. Routing and scheduling information for that transaction are stored in the routing/scheduling field 54 of the record, and billing information, such as client account numbers, are stored in the billing field 56 of the record.

If a client requests tracking of a package, the tracking resource 38 is used to reference the record 50 for the transaction in question, and the computer system can verify whether a package has been received, or query for information on the progress of the transportation of a package by the airlines via their computers. From time to time, the billing resource can be employed to generate client bills based on the billing fields of the various transaction records stored in the computer system 32. The scheduling facility 40 serves to periodically obtain updated scheduling information from the airlines 14, merge it, and put it in a format to be displayed in the outgoing receiving area 22. The computer can interface with existing airline computer systems such as American Airlines' SABRE system.

Figure 5:
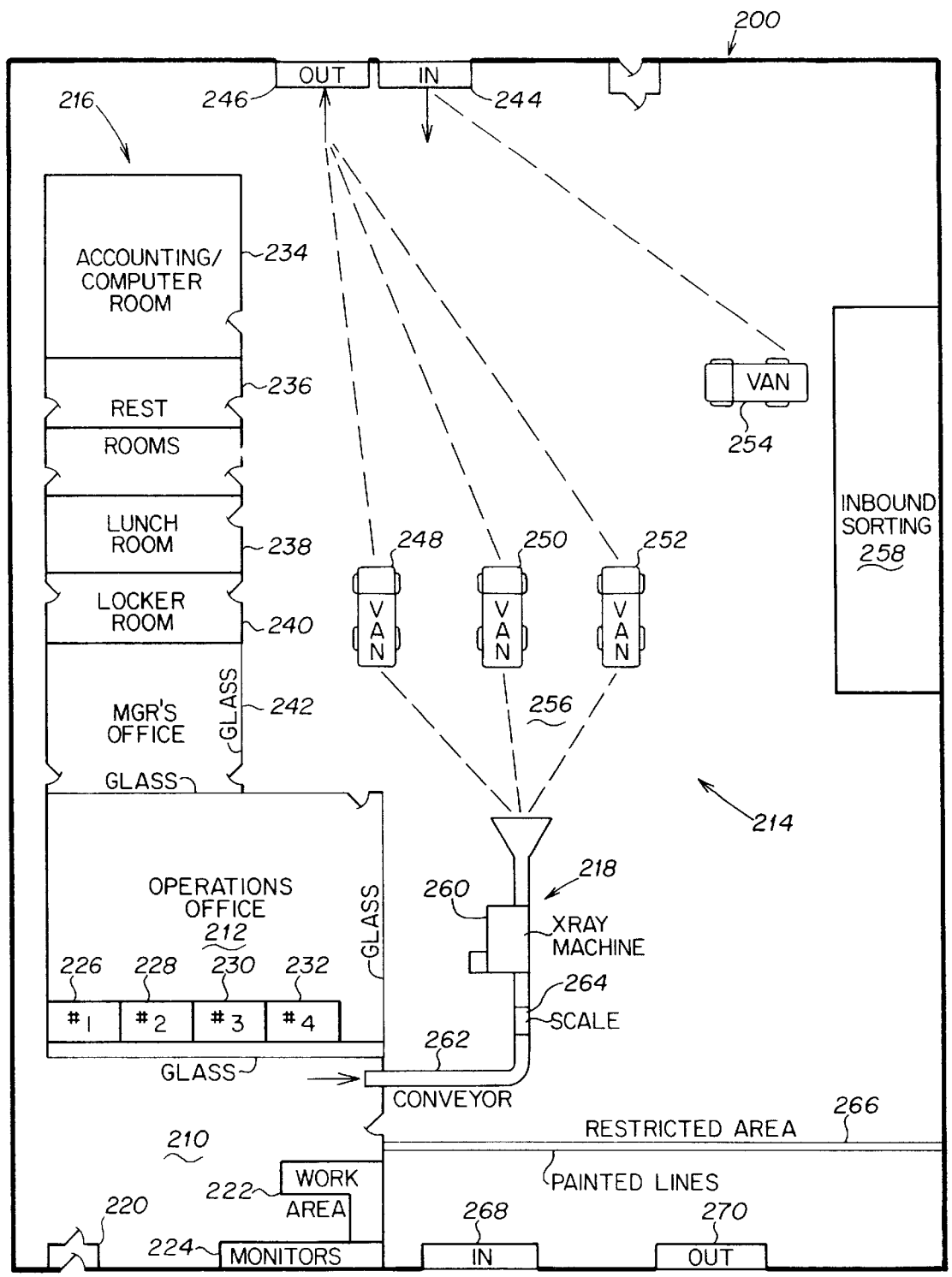
FIG. 5 is a floor plan of a central facility according to one aspect of the invention.

Referring to FIG. 5, central processing facility 200 according to one aspect of the invention includes a customer service area 210, an operations office 212, a shipping area 214, support offices 216, and a package security area 218. The customer service area includes a delivery personnel entrance 220, which can include a locking vestibule feature as discussed above. This area also includes a work area 222, in which delivery personnel can fill out blank airbill forms. Airline departure and arrival monitors 224 are placed on a wall within this area.

The operations office includes four clerk stations 226, 228, 230, 232, which are separated from the customer service area 210 by a glass barrier, which may be bulletproof. Each of the clerk stations includes a computer terminal for inputting airbill information and for receiving a go-ahead from the package security area 218. The support offices 216 include an accounting office 234 in which the computer system resides, rest rooms 236, a lunch room 238, a locker room 240, and a manager's office 242.

The shipping area 214 has a vehicle entrance 244 and a vehicle exit 246 which communicate with the secure periphery of the airport. Vans 248, 250, 252, 254 can enter and exit through these doors and can proceed to either an outbound sorting area 256 or an inbound sorting area 258. Preferably the vans are divided into different areas for different airlines and/or incoming and outgoing packages.

The package security area 218 includes a conveyor belt 262, which can bring packages in from the customer service area 210 to a scale 264. After the scale on the conveyor belt is an X-ray machine 260. The shipping area 214 and the security area 218 form part of a restricted area that is delimited by a painted line 266. Outside of the restricted area are a second vehicle entrance 268 and a second vehicle exit 270, which can lead to the parking lot of the facility. It is contemplated that the whole facility 200 will occupy approximately 4000 to 5000 square feet.

In operation, delivery personnel bring packages with completed blank airbill forms to one of the clerk stations 226, 228, 230, 232 in the customer service area 210. After one of the clerks receives and scans the delivery person's identification, a delivery person puts his or her package on the conveyor belt 262. Security personnel then weigh the package on the scale 264 and X-ray it with the X-ray machine 260. If the weight and scanned image are satisfactory, the X-ray machine or the operator of the X-ray machine sends an indication to the clerk's computer. Once the clerk receives this indication, he or she provides the delivery person with his or her copy of the airbill. The computer generates a label for the package that includes its airline flight number and a standard airport destination code.

Once each package is processed through the package security area 218, it can be provided to one of the outgoing vans 248, 250, 252, which periodically bring packages to the airlines. Incoming packages are sorted at the inbound sorting area 258, and provided to delivery personnel at the customer service area 210.

Preferably, central facility personnel are able to perform two or more of the functions in the facility. In particular, it is advantageous to alternate X-ray machine monitoring personnel frequently as it has been found to be difficult to maintain a high level of concentration at this position. For this reason, persons working at the clerk positions and/or driving the vans can alternatively serve at the X-ray machine.

The present invention has now been described in connection with a number of specific embodiments thereof. However, numerous modifications which are contemplated as falling within the scope of the present invention should now be apparent to those skilled in the art. For example, although it is desirable to implement many of the functions performed according to the invention using a computer, a well-implemented paper-based system can also serve these purposes. Therefore, it is intended that the scope of the present invention be limited only by the scope of the claims appended hereto.

What is claimed is:

1. A method of transporting packages, comprising:
receiving a plurality of packages from multiple sources over a time period at a central processing facility,
receiving self-reported identification information from each of the sources,
receiving objective security information for each one of the sources at the processing facility, the security information being, for each particular one of the sources, about at least one of that particular source and the package received from that particular source,
maintaining a database of the identification and security information,
receiving a request for a destination for each of the packages,
evaluating the security information for each of the packages,
selectively approving ones of the packages in response to the step of evaluating,
selecting different ones of a plurality of passenger air carriers for the packages approved in the step of approving,
transporting the approved packages from the processing facility to the passenger air carriers selected in the step of selecting, and
retaining the self-reported identification information and the objective security information for each of the selected approved packages until after the selected airline has transported that package to its destination.

2. The method of claim 1 wherein the step of transporting transports the packages to an area alongside a passenger airplane.

3. The method of claim 1 wherein the step of receiving security information includes photographing a person delivering each package.

4. The method of claim 3 further including the step of obtaining scanned images of the contents of the packages.

5. The method of claim 1 wherein the step of receiving security information includes reproducing identification belonging to a person delivering the package.

6. The method of claim 1 wherein the step of receiving security information includes inspecting the packages.

7. The method of claim 6 wherein the step of inspecting includes obtaining scanned images of the contents of the packages.

8. The method of claim 1 further including the step of displaying passenger air carrier scheduling information at the facility for the plurality of air carriers.

9. The method of claim 1 wherein the step of maintaining a database includes storing by a computer a record that associates the security information with information about the step of transporting.

10. The method of claim 9 further including the step of communicating with the passenger air carriers with the computer system.

11. The method of claim 1 further including the steps of:
receiving further packages from the passenger airline carriers, and
receiving further security information relating to the each of the further packages.

12. The method of claim 1 wherein all of the packages received at the processing facility weigh less than 70 lbs.

13. The method of claim 1 wherein the step of transporting is performed within two hours after the step of receiving for substantially all of the packages received at the processing facility.

14. The method of claim 13 wherein the step of transporting is performed within one half hour after the step of receiving for substantially all of the packages received at the processing facility.

15. A facility for selective transport of packages, comprising:
- a central receiving area for receiving packages from a plurality of individuals,
- security apparatus proximate the receiving area for obtaining and recording in a database security information relating to the package and the delivery individual,
- a plurality of airline carrier facilities disposed near the receiving area, and
- transportation means for transporting the packages from the receiving area to the plurality of airline facilities.

16. The apparatus of claim 15 wherein the receiving area and the security apparatus are located in a structure which opens into a secure periphery of an airport.

17. The apparatus of claim 15 further including a computer system including record storage responsive to the security apparatus.

18. The apparatus of claim 17 wherein the computer includes means for associating security information from the security apparatus with information relating to transportation of the package.

19. The apparatus of claim 15 further including a computer system including links to a plurality of airlines, and a display within the receiving area.

20. The apparatus of claim 15 further including parking spaces within 100 feet of the receiving area.

21. The apparatus of claim 15 wherein the security apparatus includes image capture apparatus constructed and adapted to capture images of delivery personnel.

22. The apparatus of claim 15 wherein the security apparatus includes image capture apparatus constructed and adapted to capture images of the identification of delivery personnel.

23. The apparatus of claim 15 wherein the security apparatus includes image capture apparatus constructed and adapted to capture images from within the package.

24. The apparatus of claim 15 further including a sorting area for separating the received packages destined for different passenger airline carriers.

25. A memory for storing data for access by an application program being executed on a data processing system, comprising:
- a data structure stored in said memory, said data structure including information resident in a database used by said application program and including:
  - a package transportation identification field containing information identifying a sender of a package,
  - a routing information field containing information identifying a one of a plurality of passenger air carriers that is to transport the package, and
  - a security information field containing security information about the sender of the package.

* * * * *